Figure 1:
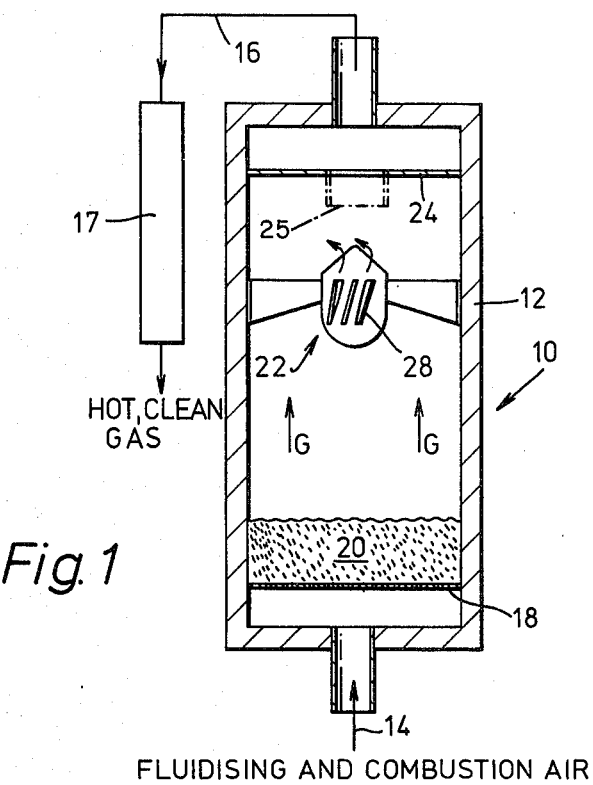

United States Patent [19]

Jubb

[11] 4,161,917

[45] Jul. 24, 1979

[54] FLUIDIZED BED COMBUSTION APPARATUS

[75] Inventor: Albert Jubb, Kenilworth, England

[73] Assignee: Rolls-Royce Limited, London, England

[21] Appl. No.: 944,657

[22] Filed: Sep. 21, 1978

Related U.S. Application Data

[63] Continuation of Ser. No. 776,917, Mar. 11, 1977, abandoned.

[30] Foreign Application Priority Data

Mar. 26, 1976 [GB] United Kingdom ............... 12176/76

[51] Int. Cl.² ............................................. F23D 19/00
[52] U.S. Cl. ............................... 110/263; 60/39.46 S; 422/145
[58] Field of Search ....................... 110/263; 122/4 D; 23/288.5; 60/39.46 S; 55/456, 457; 34/57 A

[56] References Cited

U.S. PATENT DOCUMENTS

| 2,640,845 | 6/1953 | Beck et al. ........................... 23/288 S |
| 2,833,632 | 5/1958 | Spitz et al. ............................ 34/57 A |
| 2,847,087 | 8/1958 | Johnson .................................. 55/457 |
| 2,878,162 | 3/1959 | Clouse et al. ....................... 23/288 S |
| 3,306,236 | 2/1967 | Campbell ............................. 34/57 A |
| 3,517,821 | 6/1970 | Monson et al. ........................ 55/457 |
| 3,924,402 | 12/1975 | Harboe ............................. 60/39.18 C |
| 3,996,863 | 12/1976 | Osborn ................................ 122/4 D |

Primary Examiner—Louis J. Casaregola
Attorney, Agent, or Firm—Cushman, Darby & Cushman

[57] ABSTRACT

A fluidized bed combustion apparatus comprises a vessel in which a bed of fluidizable combustible and inert materials is supported, an inlet for a flow of fluidizing and combustion gas, an outlet for a flow of heated gas and gas swirling means located in the vessel between the fluidizable bed and the vessel outlet, the function of the gas swirling means being to retain any unburnt or only partially burnt materials in the vessel until combustion is complete.

3 Claims, 3 Drawing Figures

FLUIDISING AND COMBUSTION AIR

FLUIDIZED BED COMBUSTION APPARATUS

This is a continuation of application Ser. No. 776,917, filed Mar. 11, 1977 (abandoned).

This invention relates to fluidised bed combustion apparatus and is particularly concerned with fluidised bed combustion apparatus which is used to burn a particulate fuel such as coal. The gases from such a combustion apparatus are commonly passed through cyclone separators or other forms of gas cleaner which are located downstream of the fluidised bed in order to remove particulate matter e.g. ash from the gas. Under certain flow conditions taking into account the size of the fuel particles being burnt, it may be possible for incompletely combusted fuel particles to enter the cyclone separators and cause considerable damage as the still burning particles will be at a relatively high temperature.

The present invention seeks to provide a method and means whereby all or substantially all the fuel particles will be completely burnt before the hot gases enter the cyclone separators or other particle removing apparatus.

The present invention provides a fluidised bed combustion apparatus including a vessel having a support means for a bed of fluidisable inert and combustible materials, an inlet for a flow of fluidising and combustion gas, an outlet for a flow of heated gas and gas swirling means located in the vessel between the fluidisable bed and the outlet from the vessel.

The gas swirling means may comprise a number of angled vanes extending from a central boss to the wall of the vessel.

A restrictor plate having an outlet may be located above the gas swirling means so that the hot swirling gas has to spin to the centre of the vessel before it can pass through the outlet to the cyclone separators.

Figure 2:
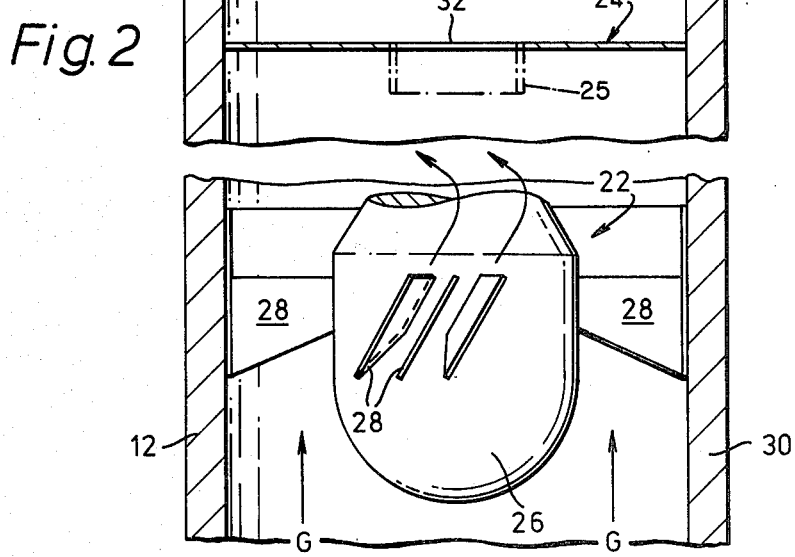
Figure 3:
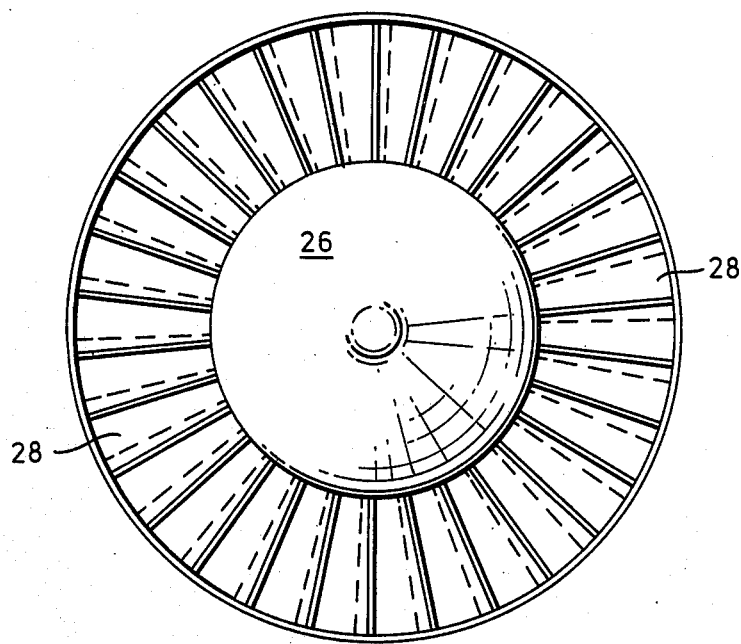

The present invention will now be more particularly described with reference to the accompanying drawings in which:

FIG. 1 shows a diagrammatic representation of a fluidised bed combustion apparatus incorporating one form of gas swirling means according to the present invention, FIG. 2 shows an elevation of the gas swirling means shown in FIG. 1 to a larger scale, and FIG. 3 shows a plan view of the apparatus shown in FIG. 2.

Referring to the Figs., a fluidised bed combustion apparatus 10 comprises a vessel 12 which receives a supply 14 of fluidising and combustion air and discharges heated gas 16 to cyclone separators 17 (shown diagrammatically) or some other form of cleaning apparatus where dust particles are removed from the heated air. In the vessel 12 is a distributor plate 18 through which the air 14 flows and which supports a bed 20 of inert and combustible materials, a gas swirling means 22 and a restrictor plate 24 which are both described in more detail with reference to FIG. 2.

Referring more particularly to FIGS. 2 and 3, the gas swirling means 22 comprises a central boss 26 and a number of angled vanes 28 which extend between the boss and the wall 30 of the vessel 12. Hot gases (indicated by arrows G) from the bed 20 flow through the gas swirling apparatus 22 to cyclone cleaners 17 in which particulate completely burnt products of combustion entrained by the gas are separated from the gas.

Under certain flow conditions in prior art fluidised bed combustion apparatus, not all the particulate fuel may be burnt in the main body of the bed and partially burning particles, e.g. coal particles may be carried up into cyclones where the particles will continue to burn until completely combusted and will cause damage to the cyclone separators.

Any such particles in the present arrangement will flow through the apparatus 22 and will be given a swirl component thereby delaying for a short period of time the flow of any still burning fuel particles into the cyclone separators 17. This period gives any still burning fuel particle time to completely burn out before it can enter the cyclone separators 17.

Above the gas swirling means 22, and spaced apart from it by say 1 or 2 diameters, a restrictor plate 24 having a vertical central outlet 32 of restricted size ensures that swirling gas has to spin to the centre of the vertical outlet 32. In some instances, a reentrant portion, as shown in broken lines at 25, is provided around the vertical outlet or aperture 32 and extends downwardly therefrom towards the swirling means 22, the reentrant portion 25 being spaced above and from the swirling means and providing an even better effect of insuring the swirling gas has to spin to the center of the vertical outlet. Unburnt particles are centrifuged out onto the walls 30, and the restrictor plate 24 stops all but small fractions rising with the flow and so retains them on the walls, where they accumulate as a spinning layer. As more particles accumulate in this layer, the concentration reduces the ratio of air drag to weight so accumulations of unburnt fuels either burn out on the walls 30, or fall down against the airflow and onto the swirl vanes 28, and fall down through these back into the fluidised bed 20. The angles of the vanes 28 must not be too flat, or the accumulation will not fall back against the airflow upwards, and angles of less than 45° to horizontal are found not to be suitable for the purpose.

Any large particles of the bed inert material thrown up off the top of the bed by bursting bubbles also will pass through the gas swirling means 22, scrub on the walls 30, and fall down backwards through the swirler vanes 28 acting as a scrubbing agent to remove any combustion ash which might tend to stick to the walls.

The design of the bas swirling means 22 and restrictor plate 24 is intended to retain burnable particles above the size which can be expected to burn out completely in the period between leaving the restrictor plate 24 and entering the cyclone separators 17.

The ash retained in the fluidised bed is expected to break itself down by self attrition in and above the bed, so that ultimately substantially all the coal ash will work its way through the gas swirling means 22 and restrictor plate 24 into the cyclone separators. Stone from uncleaned coal may however have to be extracted from the bed, as it accumulates, by overflowing a weir or similar system.

What we claim is:

1. A fluidised bed combustion apparatus for burning a particulate combustible material fluidised in a particulate inert material to produce heated exhaust gases for use as power, said apparatus comprising: a vessel, a bed of fluidisable inert material and combustible material in said vessel, means for supporting said bed above the bottom of said vessel, said vessel having an inlet for a flow of fluidising and combustion gas positioned beneath and spaced from said bed, said vessel also having an outlet remote from said inlet and positioned above said bed for discharge from said vessel of a flow of the heated exhaust gases and any entrained completely burnt particulate combustible material, particle separating means in series with and positioned downstream of the outlet of said vessel for separating the completely burnt particulate combustible material from the heated exhaust gases, gas-swirling means positioned in said vessel in spaced relationship above said bed and spaced relationship below said outlet, said gas-swirling means being arranged to impart a swirling motion to the heated exhaust gases, completely burnt particulate combustible material and partially burnt particulate material whereby dwell time of the partially burnt particulate material in the vessel is increased by the partially burnt particulate material being centrifuged towards the wall of said vessel to completely burn within the vessel or fall back to said bed through said swirling means, said gas-swirling means including a central hub and a plurality of static vanes extending between the wall of said vessel and said central hub, each of said vanes having an angle of less than 45° with a vertical axis of said vessel and said central hub and vanes having an axis substantially parallel to the flow direction of the heated exhaust gases rising from said bed towards said outlet of said vessel and coincident with the vertical axis of said vessel.

2. An apparatus as claimed in claim 1 in which the vessel has a restrictor plate located between the gas swirling means and the outlet from the vessel, the restrictor plate having an aperture of restricted size for the flow of gas from the gas swirling means.

3. An apparatus as claimed in claim 2 in which the restrictor plate has a reentrant portion extending from the aperture towards the gas swirling means.

* * * * *